US012011922B2

(12) United States Patent
Nomura et al.

(10) Patent No.: US 12,011,922 B2
(45) Date of Patent: Jun. 18, 2024

(54) PRINT ELEMENT SUBSTRATE, PRINTHEAD, AND PRINTING APPARATUS

(71) Applicant: CANON KABUSHIKI KAISHA, Tokyo (JP)

(72) Inventors: Hiroyasu Nomura, Tokyo (JP); Mineo Shimotsusa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 98 days.

(21) Appl. No.: 17/313,595

(22) Filed: May 6, 2021

(65) Prior Publication Data

US 2021/0370670 A1 Dec. 2, 2021

(30) Foreign Application Priority Data

May 29, 2020 (JP) ................................. 2020-094906

(51) Int. Cl.
*B41J 2/045* (2006.01)
*B41J 2/14* (2006.01)

(52) U.S. Cl.
CPC ......... *B41J 2/04563* (2013.01); *B41J 2/0458* (2013.01); *B41J 2/14153* (2013.01)

(58) Field of Classification Search
CPC .................................................... B41J 2/14056
See application file for complete search history.

(56) References Cited

U.S. PATENT DOCUMENTS 5,706,041 A * 1/1998 Kubby .................. B41J 2/1628 347/65
6,644,774 B1 * 11/2003 Burger .................. B41J 29/393 347/17
9,919,519 B2 3/2018 Ge
10,940,640 B2 3/2021 Taniguchi et al.
2003/0001927 A1 1/2003 Oda et al.
2006/0081239 A1 * 4/2006 Alley .................... A61M 15/00 128/200.14
2006/0221136 A1 10/2006 Silverbrook et al.
2011/0211000 A1 * 9/2011 Aoki ...................... B41J 2/0458 347/9
2014/0300657 A1 10/2014 Ike
(Continued)

FOREIGN PATENT DOCUMENTS

DE 4203294 C2 9/1997
JP 2009-196265 A 9/2009
(Continued)

OTHER PUBLICATIONS

Office Action dated Jun. 9, 2023 in counterpart application CN 202110581479.2 (14 pages).

*Primary Examiner* — Shelby L Fidler
(74) *Attorney, Agent, or Firm* — VENABLE LLP

(57) ABSTRACT

A print element substrate, comprising a base, a heater provided on the base and configured to generate heat used to discharge ink, a flow path member, which forms an ink flow path, configured to form, together with the base, a bubbling chamber in which the ink is bubbled by the heat of the heater provided in a bottom surface of the bubbling chamber, and a temperature sensor capable of detecting a temperature of the bubbling chamber, the temperature sensor being formed of the same material as the heater and provided in the same layer as the heater on the base.

11 Claims, 19 Drawing Sheets

(56) References Cited

U.S. PATENT DOCUMENTS

| | | | | |
|---|---|---|---|---|
| 2016/0347054 | A1* | 12/2016 | Ge | B41J 2/04563 |
| 2018/0037029 | A1 | 2/2018 | Hirayama | |
| 2018/0162049 | A1 | 6/2018 | Taniguchi et al. | |
| 2018/0169941 | A1 | 6/2018 | Taniguchi et al. | |
| 2019/0105921 | A1 | 4/2019 | Kanno et al. | |
| 2019/0299600 | A1* | 10/2019 | Nomura | B41J 2/04563 |
| 2020/0016896 | A1* | 1/2020 | Oohashi | B41J 2/1601 |
| 2023/0101931 | A1* | 3/2023 | Nomura | B41J 2/0458<br>347/14 |

FOREIGN PATENT DOCUMENTS

| | | | |
|---|---|---|---|
| JP | 2017-1393 | A | 1/2017 |
| JP | 2017-501063 | A | 1/2017 |
| JP | 2019-72999 | A | 5/2019 |

* cited by examiner

PRINT ELEMENT SUBSTRATE, PRINTHEAD, AND PRINTING APPARATUS

BACKGROUND OF THE INVENTION

Field of the Invention

The present invention relates to mainly a print element substrate.

Description of the Related Art

Among inkjet printing apparatuses, there is a thermal inkjet printing apparatus that discharges ink from a nozzle using heat energy generated by a heater (electrothermal transducer). Japanese Patent Laid-Open No. 2019-72999 discloses a structure of a thermal inkjet printing apparatus in which a conductive plug is provided in the terminal portion of a temperature sensor provided immediately below a heater, and the temperature sensor is connected to a wiring layer in a lower layer.

The temperature sensor is required to detect a temperature change based on the discharge mode of ink rather than the driving mode of the heater. Therefore, the inkjet printing apparatus in Japanese Patent Laid-Open No. 2019-72999 has room for structural improvement.

SUMMARY OF THE INVENTION

The present invention has as its exemplary object to implement, with a relatively simple structure, appropriate detection of a temperature change based on the discharge mode of ink after a heater is driven.

One of the aspects of the present invention provides a print element substrate, comprising a base, a heater provided on the base and configured to generate heat used to discharge ink, a flow path member, which forms an ink flow path, configured to form, together with the base, a bubbling chamber in which the ink is bubbled by the heat of the heater provided in a bottom surface of the bubbling chamber, and a temperature sensor capable of detecting a temperature of the bubbling chamber, the temperature sensor being formed of the same material as the heater and provided in the same layer as the heater on the base.

Further features of the present invention will become apparent from the following description of exemplary embodiments (with reference to the attached drawings).

DESCRIPTION OF THE EMBODIMENTS

Figure 1A:
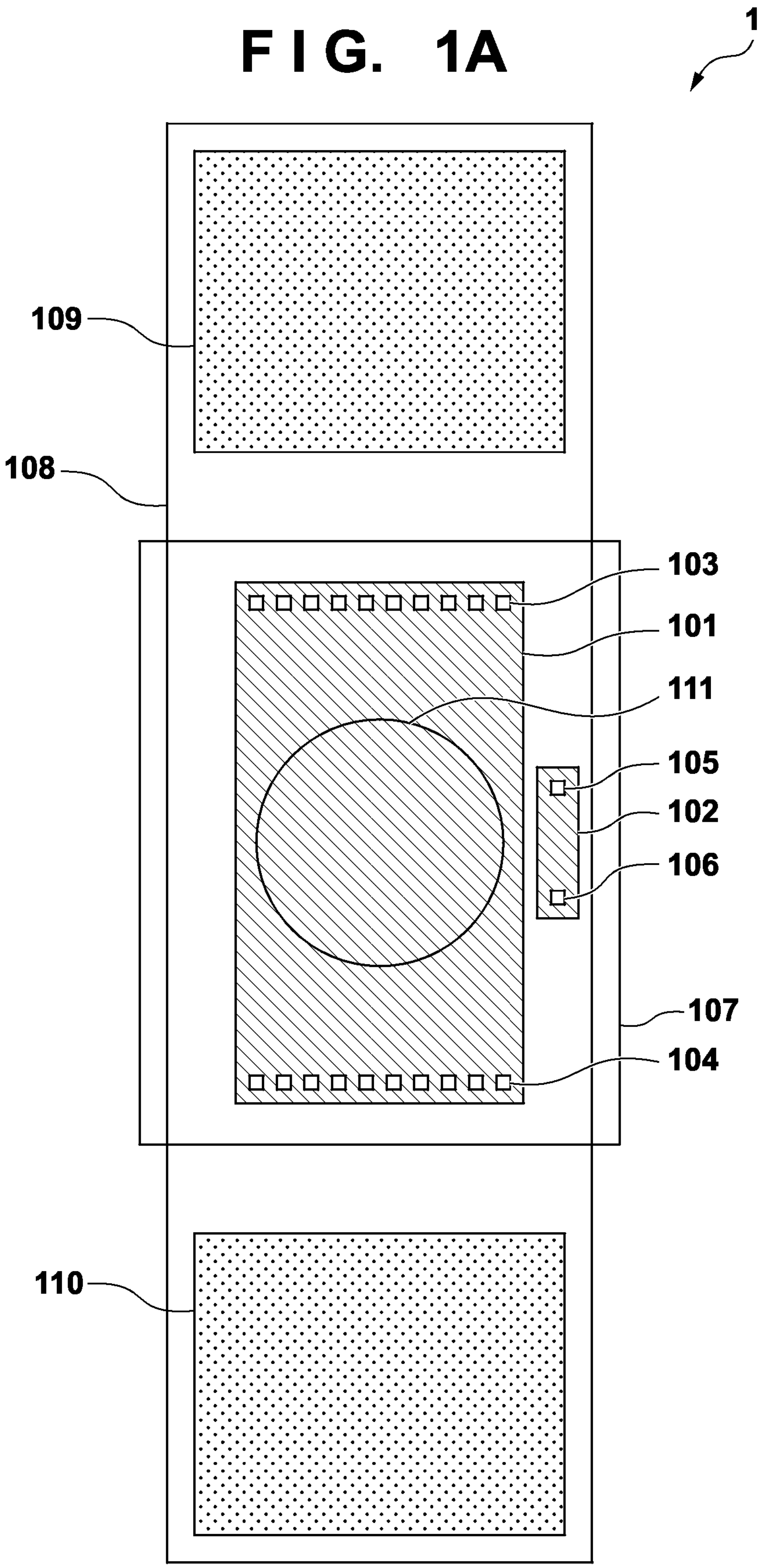
FIG. 1A is a schematic plan view of a print element substrate according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Hereinafter, embodiments will be described by exemplarily showing print element substrates each included in a printhead of an inkjet printing apparatus. However, the material to be discharged is not limited to ink but may be another liquid. That is, the inkjet printing apparatus to be exemplarily shown in each of the following embodiments is an example of a liquid discharge apparatus, the printhead is an example of a liquid discharge head, and the print element substrate is an example of a head substrate.

First Embodiment

Figure 1B:
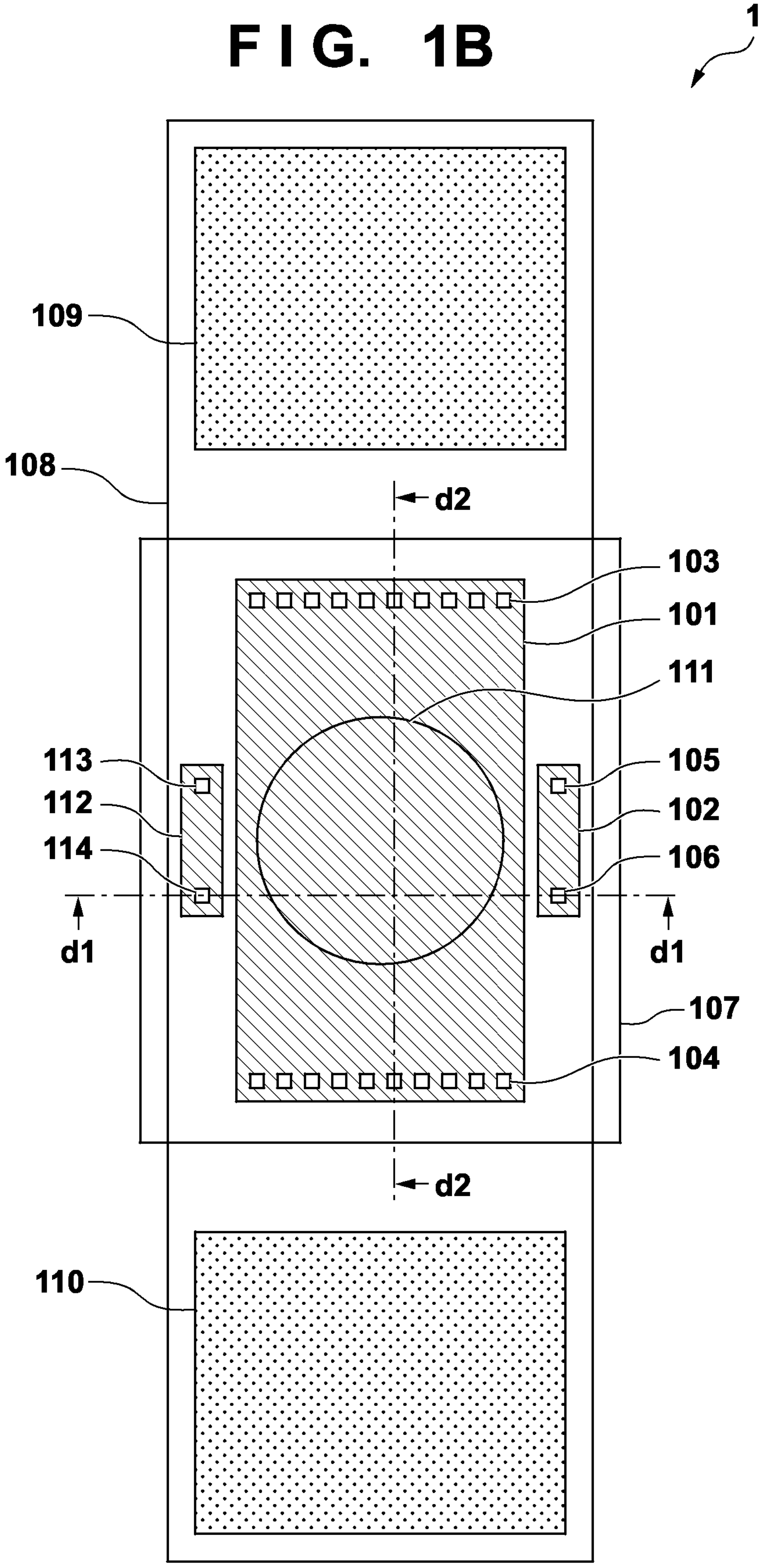
FIG. 1B is a schematic plan view of another print element substrate according to the embodiment.
Figure 2A:
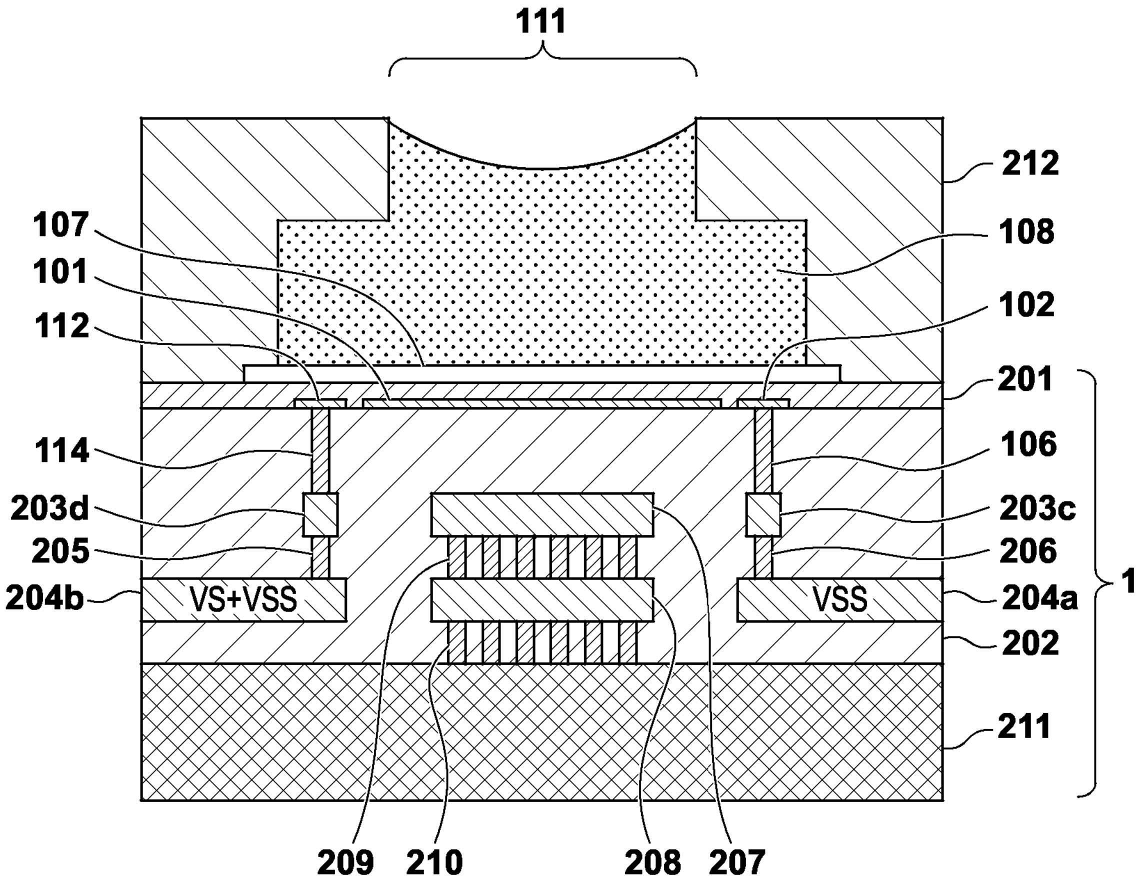
FIG. 2A is a schematic sectional view of the print element substrate according to the embodiment.

FIG. 1B is a schematic plan view showing a part of the arrangement of a print element substrate 1 according to the first embodiment. The print element substrate 1 is configured to be capable of driving a plurality of nozzles each capable of discharging ink. FIG. 1B shows a portion corresponding to one of the plurality of nozzles. FIG. 2A is a schematic sectional view taken along a cutting line d1-d1 in FIG. 1B, and FIG. 2B is a schematic sectional view taken along a cutting line d2-d2 in FIG. 1B.

Figure 2B:
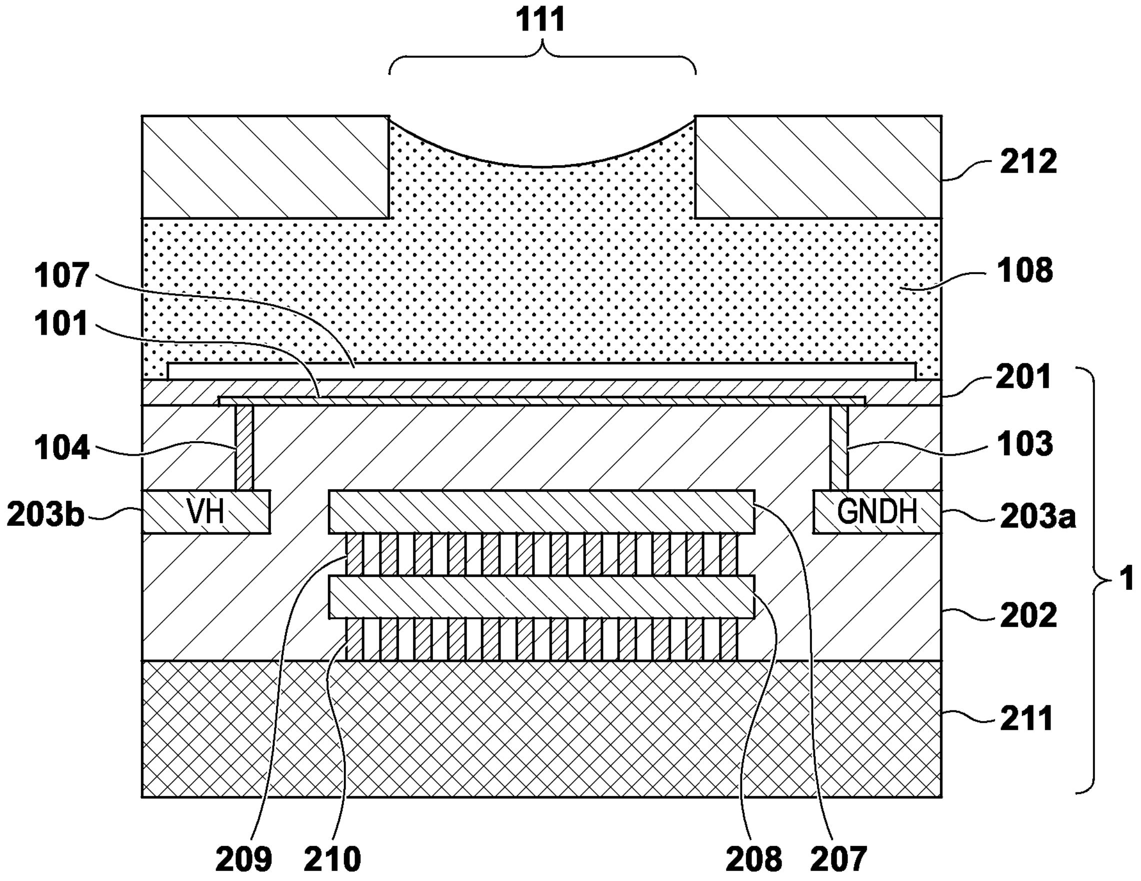
FIG. 2B is another schematic sectional view of the print element substrate according to the embodiment.

As shown in FIGS. 2A and 2B, an orifice plate 212 is arranged on the print element substrate 1 via a protective film 201 and an anti-cavitation film 107. An ink flow path 108 and a discharge port (orifice) 111 are provided in the orifice plate 212. The discharge port 111 is provided above the ink flow path 108 so as to correspond to each nozzle. Further, an ink supply port 109 and an ink outlet port 110 are provided in the print element substrate 1 so as to communicate with the ink flow path 108. The orifice plate 212 may be a part of the print element substrate 1.

For the sake of descriptive convenience, "upper/lower" described in this specification is defined to correspond to upper/lower in FIGS. 2A and 2B, that is, the side on which ink is discharged (discharge port 111 side) is defined as the upper side, and the opposite side is defined as the lower side.

The print element substrate 1 includes a heater 101 and a pair of temperature sensors 102 and 112. The heater 101 is an electrothermal transducer that generates heat when driven (energized), and provided below the discharge port 111 (so as to overlap the discharge port 111 in a planar view). For the heater 101, for example, a material such as TaSiN, which is relatively easy to form a high electric resistance, is used. The heater 101 is formed of a thin film so as to typically have a rectangular shape in a planar view.

Note that in this embodiment, the heater 101 has an oblong outer shape in a planar view, that is, has a long side as one side and a short side as the other side. Further, in this embodiment, as can be seen from FIGS. 1B, 2A, and 2B, the energization direction of the heater 101 and the extending direction of the ink flow path 108 are parallel to each other.

The temperature sensors 102 and 112 are arranged so as to be close to the central portion of the heater 101 on the long-side side in a planar view, and provided as thin films in the same layer as the heater 101. That is, the heater 101 and the temperature sensors 102 and 112 (or the thin films constituting them) are formed almost simultaneously by a predetermined step using a known semiconductor manufacturing process, for example, a deposition step, a patterning step, or the like. Accordingly, they are formed of the same material.

The protective film 201 is provided so as to cover the heater 101 and the temperature sensors 102 and 112 and insulate them from each other. For example, an insulating member of SiN or the like is used for the protective film 201.

The anti-cavitation film 107 is arranged on the protective film 201 and exposed to the ink flow path 108. The anti-cavitation film 107 is provided between the wall portion of the orifice plate 212 and the protective film 201 in the widthwise direction of the ink flow path 108 (see FIG. 2A) so as to overlap the heater 101 and the temperature sensors 102 and 112 in a planar view (see FIG. 1B). For example, a material such as Ta, which can implement desired resistance to cavitation, may be used for the anti-cavitation film 107.

As can be seen from FIG. 1B, in a planar view, the temperature sensors 102 and 112 are respectively provided at positions on both sides of the heater 101, where they overlap the anti-cavitation film 107 and the ink flow path 108.

A portion of the ink flow path 108 located above the heater 101 and its peripheral portion function as a bubbling chamber for bubbling the ink by receiving the heat of the heater 101. The temperature sensors 102 and 112 can detect the temperature of the bubbling chamber. The bubbling chamber can be specified, for example, as a portion of the ink flow path 108 that overlaps the anti-cavitation film 107 in a planar view.

Note that the structure in which the pair of temperature sensors 102 and 112 are arranged is employed in this embodiment, but one of them may be omitted. For example, as shown in FIG. 1A, the single temperature sensor 102 (or 112) may be arranged on one side of the heater 101.

The print element substrate 1 is formed by providing a plurality of wiring layers (to be also referred to as metal layers, conductive layers, or the like) in an insulating member 202 on a substrate 211. The insulating member 202 is formed by stacking a plurality of interlayer insulating films, and each of the wiring layers described above can be provided between the interlayer insulating films. A semiconductor material such as silicon can be used for the substrate 211, and an insulating material such as silicon oxide can be used for the insulating member 202.

The heater 101 and the temperature sensors 102 and 112 described above are electrically connected to each other via wiring patterns (to be also referred to as line patterns, or simply as patterns or the like) and conductive plugs (to be also referred to contact plugs, visas, or the like) provided in the plurality of wiring layers described above, thereby forming a circuit capable of implementing a print function. In this embodiment, a total of three wiring layers are provided: a first layer closest to the substrate 211, a second layer above the first layer, and a third layer provided on the insulating member 202 as the uppermost layer.

The heater 101 is connected to a wiring pattern 203*a* in the second layer via a conductive plug 103 in one end portion on the short-side side, and connected to a wiring pattern 203*b* in the second layer via a conductive plug 104 in the other end portion. Note that the wiring pattern 203*a* is grounded via a switch element 303 (see FIG. 3) to be described later, and the wiring pattern 203*b* is connected to a power supply line.

As shown in FIG. 1B, the temperature sensor 102 is connected to a predetermined wiring pattern via conductive plugs 105 and 106 provided in both end portions in the long-side direction. For example, as shown in FIG. 2A, the temperature sensor 102 is connected to a wiring pattern 203*c* in the second layer via the conductive plug 106 provided in one end portion, and is further connected to a wiring pattern 204*a* in the first layer via a conductive plug 206.

Similar to the temperature sensor 102, the temperature sensor 112 is connected to a predetermined wiring pattern via conductive plugs 113 and 114 provided in both end portions in the long-side direction. For example, as shown in FIG. 2A, the temperature sensor 112 is connected to a wiring pattern 203*d* in the second layer via the conductive plug 114 provided in one end portion, and is further connected to a wiring pattern 204*b* in the first layer via a conductive plug 205.

A heat dissipation pattern 207 is arranged in the second layer below the heater 101. The pattern 207 is connected to a heat dissipation pattern 208 in the first layer via a plug 209, and the pattern 208 is connected to the substrate 211 via a plug 210. According to such the arrangement, if the heater 101 is driven to generate heat and then the driving is suppressed, the heat is quickly dissipated to the substrate 211.

Note that the patterns 207 and 208 may be formed in the same manner as the pattern 203*a* or the like, and the plugs 209 and 210 may be formed in the same manner as the plug 205 or the like. Accordingly, for example, a material such as copper, which has a relatively low electric resistance and a relatively large thermal conductivity, may be used for them.

Figure 3:
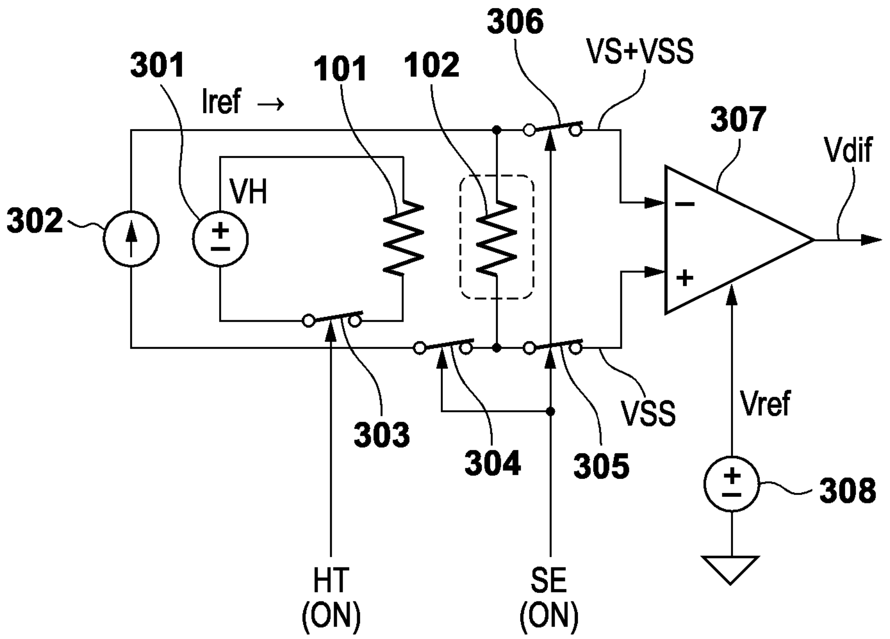
FIG. 3 is a view showing a circuit included in the print element substrate.

FIG. 3 is a circuit diagram showing a heater drive circuit for driving the heater 101 using a drive signal HT and a processing circuit for processing a signal of the temperature sensor 102 using a control signal SE.

A voltage source 301 is a constant voltage source that supplies a constant voltage VH to the heater 101 to drive the heater 101. If the drive signal HT reaches an ON level (which can be also referred to as High level, activation level, or the like), the switch element 303 is set in a conductive state, and the voltage VH is applied to the heater 101 via the conductive plug 103 (see FIG. 2B). If the drive signal HT reaches an OFF level (which can be also referred to as Low level, deactivation level, or the like), the switch element 303 is set in a non-conductive state, and the application of the voltage VH to the heater 101 is suppressed.

In this manner, the voltage VH is applied to the heater 101 in the form of a rectangle pulse in accordance with the ON/OFF level of the drive signal HT, and the heater 101 is driven. Although the details will be described later, this causes an ink droplet 501 (see FIGS. 5A and 5B) to be described later to be discharged from the discharge port 111.

A current source 302 is a constant current source used to supply a constant current Iref to the temperature sensor 102. If the control signal SE reaches an ON level (which can be also referred to as High level, activation level, or the like), a switch element 304 is set in a conductive state, and the current Iref is supplied to the temperature sensor 102 via the conductive plug 105 (see FIG. 1B). Further, each of switch elements 305 and 306 is set in a conductive state, and the voltages in both end portions of the temperature sensor 102 (VSS is the voltage in one end portion, and VS+VSS is the voltage in the other end portion) are input to a differential amplifier 307. If the control signal SE reaches an OFF level (which can be also referred to as Low level, deactivation level, or the like), the switch element 304 is set in a non-conductive state. This suppresses the supply of the current Iref to the temperature sensor 102, and also suppresses the input of the voltages in the both end portions of the temperature sensor 102 to the differential amplifier 307.

The temperature to be detected by the temperature sensor 102 rises as the heater 101 is driven, and falls by heat dissipation via the heat dissipation pattern 207 and the like, heat dissipation to the ink flow path 108, and the like.

Here, letting T be the temperature detected by the temperature sensor 102, RS be the electric resistance value of the temperature sensor, T0 be the normal temperature, RS0 be the electric resistance value of the temperature sensor at the temperature T0, and TCR be a temperature coefficient of resistance, equation (1) is obtained:

$$RS=RS0\times\{1+\mathrm{TCR}\times(T-T0)\} \quad (1)$$

When the current Iref is supplied to the temperature sensor 102, a potential difference VS is generated between the both end portions of the temperature sensor 102. This potential difference VS is expressed by equation (2):

$$\begin{aligned} VS &= Iref\times RS \\ &= Iref\times RS0\{1+TCR\times(T-T0)\} \end{aligned} \quad (2)$$

The above-described potential difference VS is input to the differential amplifier 307, and the differential amplifier 307 outputs a voltage Vdif corresponding to the above-described potential difference VS. As an offset voltage which enables implementation of a desired circuit operation, a voltage Vref is applied to the differential amplifier 307. Letting Gdif be the amplification factor of the differential amplifier 307, the output voltage Vdif of the differential amplifier 307 is expressed by equation (3):

$$V\mathrm{dif}=V\mathrm{ref}-G\mathrm{dif}\times VS \quad (3)$$

Figure 4:
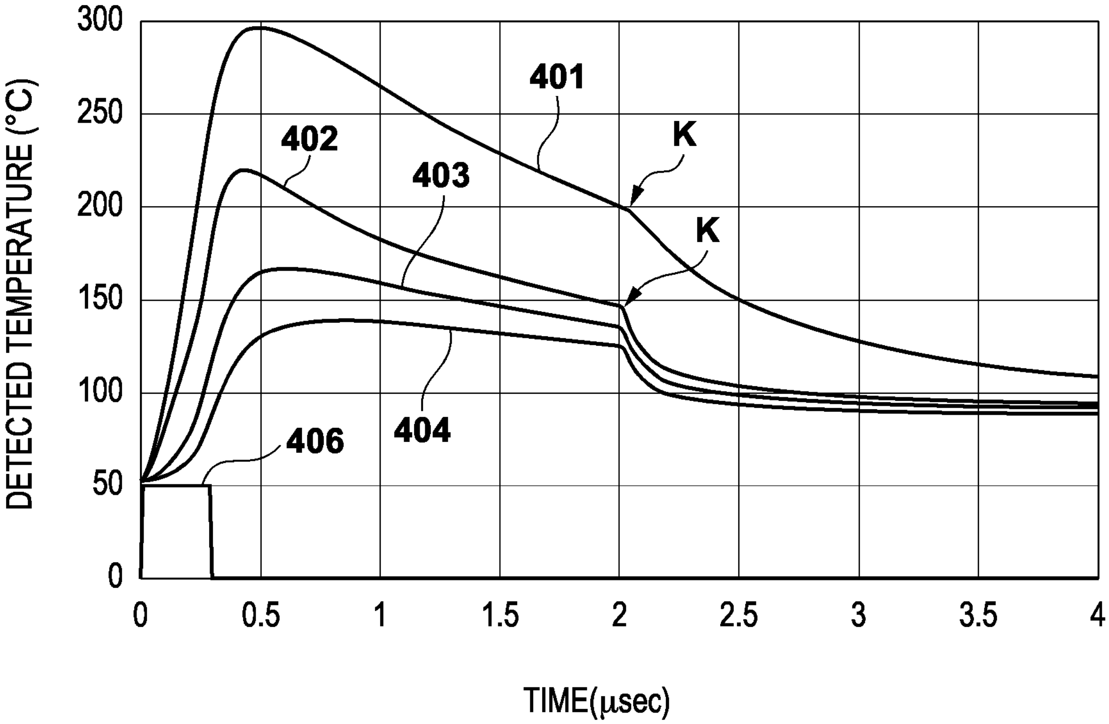
FIG. 4 is a graph showing a simulation result of the detected temperature.

FIG. 4 shows a simulation result of the temperature (to be simply referred to as the detected temperature hereinafter) detected by the temperature sensor 102 when the heater 101 is driven by the drive signal HT having a pulse width of 0.3 μs. A waveform 406 represents the drive signal HT. A waveform 401 represents the detected temperature in a case in which the temperature sensor 102 is provided below the heater 101 via the interlayer insulating film of the insulating member 202 as a reference example. Waveforms 402, 403, and 404 represent the detected temperatures of the temperature sensor 102 in this embodiment, and correspond to cases in which the spacing between the heater 101 and the temperature sensor 102 is 0.5 μm, 1.0 μm, and 1.5 μm, respectively.

Figure 5A:
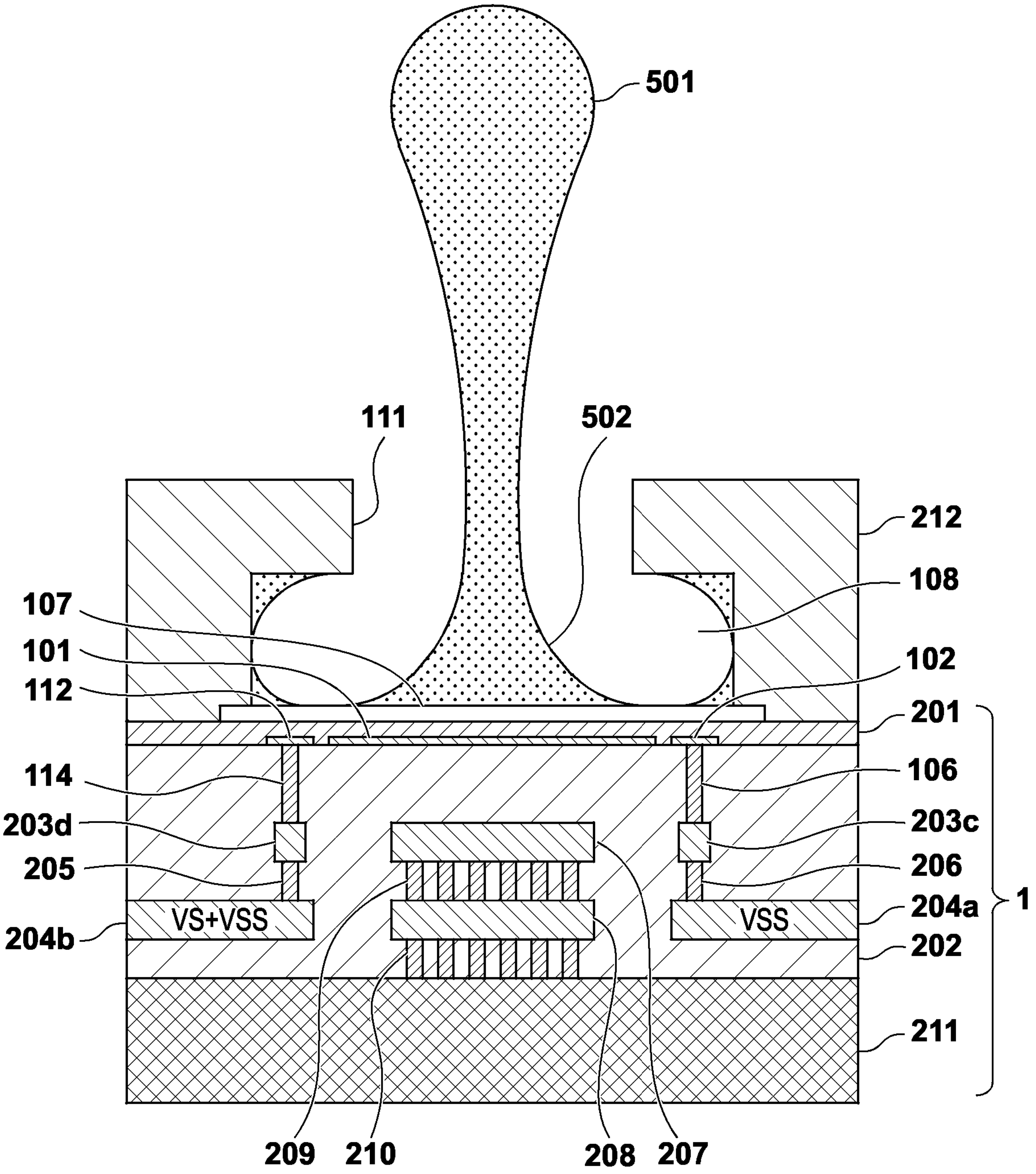
FIG. 5A is a schematic sectional view of the print element substrate at the time of discharging an ink droplet.
Figure 5B:
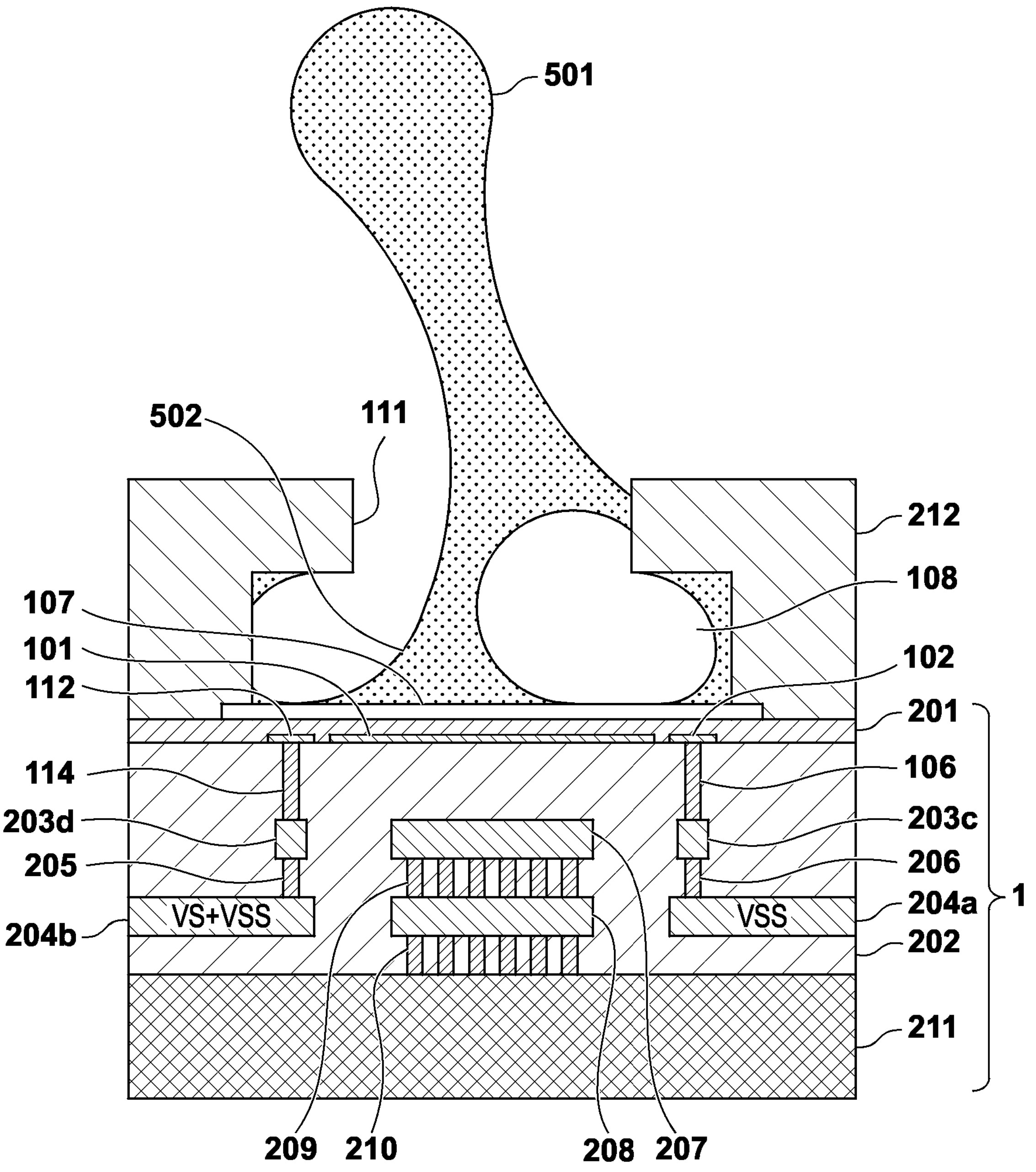
FIG. 5B is another schematic sectional view of the print element substrate at the time of discharging an ink droplet.

Each of FIGS. 5A and 5B is a schematic sectional view taken along the cutting line d1-d1 showing a state in which the ink droplet 501 is discharged from the discharge port 111. At the time of discharge, a part of the ink droplet 501 returns into the ink flow path 108 (bubbling chamber thereof) as a so-called trailing due to the negative pressure of the bubble formed by driving of the heater (this will be referred to as a return ink droplet 502). FIG. 5A shows a state in which the ink droplet 501 is discharged in a direction almost perpendicular to the surface of the orifice plate 212, and FIG. 5B shows a state in which the ink droplet 501 is discharged in a direction inclined with respect to the surface of the orifice plate 212.

As shown in FIG. 4, in the case of the waveform 401 as the reference example (the case in which the temperature sensor 102 is provided below the heater 101 via the interlayer insulating film of the insulating member 202), the detected temperature immediately after the application of the drive signal HT is higher than the detected temperature in each of the cases of the waveforms 402 to 404 according to this embodiment. The reason for this is that in the structure of the reference example, the temperature sensor 102 can be arranged so as to face the heater 101. Another reason is that it is easy to arrange the heater 101 and the temperature sensor 102 close to each other by thinning the interlayer insulating film between them (for example, making the film thickness about 0.35 μm). For these reasons, in the structure of the reference example, the thermal resistance between the heater 101 and the temperature sensor 102 is low, and the heat generated by the heater 101 easily propagates to the temperature sensor 102.

In this embodiment (in each of the cases of the waveforms 402 to 404), the detection accuracy of the temperature sensor 102 can be improved by providing the temperature sensor 102 on the side of the heater 101 to be close to the heater 101. Further, by providing the temperature sensor 102 so as to be adjacent to the central portion of the heater 101 on the long-side side, the heat easily propagates from the heater 101 to the temperature sensor 102, and the temperature sensor 102 can be provided in an elongated shape. This enables further improvement of the detection accuracy of the temperature sensor 102.

Further, in this embodiment, as shown in FIGS. 1B, 2A, and 2B, the anti-cavitation film 107 overlaps both the heater 101 and the temperature sensor 102 in a planar view. Therefore, the heat generated by the heater 101 propagates from the heater 101 to the anti-cavitation film 107 via the interlayer insulating film of the insulating member 202, and then propagates from the anti-cavitation film 107 to the temperature sensor 102 via the interlayer insulating film.

On the other hand, after the ink droplet 501 is discharged from the discharge port 111 along with the driving of the heater 101 (for example, after about 2 μs), the anti-cavitation film 107 is cooled by the return ink droplet 502 partially returning into the ink flow path 108.

Here, as indicated by each feature point K in FIG. 4, in about 2 μs after driving the heater 101, the temperature sensor 102 is cooled by the above-described return ink droplet 502 via the protective film 201, the heater 101, and the interlayer insulating film of the insulating member 202, and the detected temperature drops relatively sharply. According to this embodiment (waveforms 402 to 404), the detected temperature drops even more sharply than in the reference example (in the case of the waveform 401). The reason for this is that the distance between the temperature sensor 102 and the return ink droplet 502 in this embodiment is smaller than that in the reference example.

Thus, in this embodiment, the thermal resistance between the temperature sensor 102 and the return ink droplet 502 is lower than in the reference example, and the temperature sensor 102 is easily cooled by the return ink droplet 502. Therefore, according to this embodiment, it can be said that the temperature sensor 102 can appropriately detect the return ink droplet 502. In other words, in this embodiment, the temperature sensor 102 is more suitable for detecting a temperature change in the bubbling chamber of the ink flow path 108 due to the return ink droplet 502 than for detecting a temperature change of the heater 101.

Here, as shown in FIG. 5A, when the ink droplet 501 is appropriately discharged, the return ink droplet 502 can be generated in the central portion of the heater 101 as indicated by an alternate long and short dashed line. On the other hand, as shown in FIG. 5B, when the ink droplet 501 is inappropriately discharged, the return ink droplet 502 can be generated at a position shifted from the central portion of the heater 101. In this case, the influence that can be exerted on the detected temperature after the feature point K is relatively small for the waveform 401 of the reference example, but is larger for the waveforms 402 to 404 of this embodiment than in the reference example (waveform 401).

More specifically, the closer the return ink droplet 502 is to the temperature sensor 102, the more sharply the detected temperature after the feature point K drops, and the farther the return ink droplet 502 is from the temperature sensor 102, the more moderately the detected temperature after the feature point K drops. Accordingly, in the case shown in FIG. 5B, the detected temperature after the feature point K drops relatively moderately.

As shown in FIG. 1B, in this embodiment, the temperature sensor 112 is arranged on the opposite side of the temperature sensor 102 with respect to the heater 101, that is, the pair of temperature sensors 102 and 112 are arranged so as to be symmetric with respect to the heater 101. Similar to the temperature sensor 102, the temperature sensor 112 can appropriately detect a temperature change in the bubbling chamber of the ink flow path 108 based on the return ink droplet 502 generated after the heater 101 is driven. When the return ink droplet 502 is biased from the central portion to the one end portion side of the heater 101, the detection results of the pair of temperature sensors 102 and 112 are different from each other. Therefore, based on the detection results of the temperature sensors 102 and 112, it can be determined whether the ink droplet 501 has been appropriately discharged (whether the ink droplet 501 has been discharged in the direction perpendicular to the surface of the orifice plate 212).

Further, according to this embodiment, it is also possible to calculate the discharge direction of the ink droplet 501 based on the drop modes of the detected temperatures of the temperature sensors 102 and 112 (that is, the difference between the change amounts of the detected temperatures after the feature point K).

The heater 101 and the temperature sensors 102 and 112 are arranged in the same layer. In this embodiment, they are arranged on the upper surface of the insulating member 202 and in the third layer closest to the ink flow path 108. Therefore, it is possible to appropriately implement both heating of the ink by the heater 101 and detection of a temperature change due to the return ink droplet 502 by the temperature sensors 102 and 112.

Figure 6A:
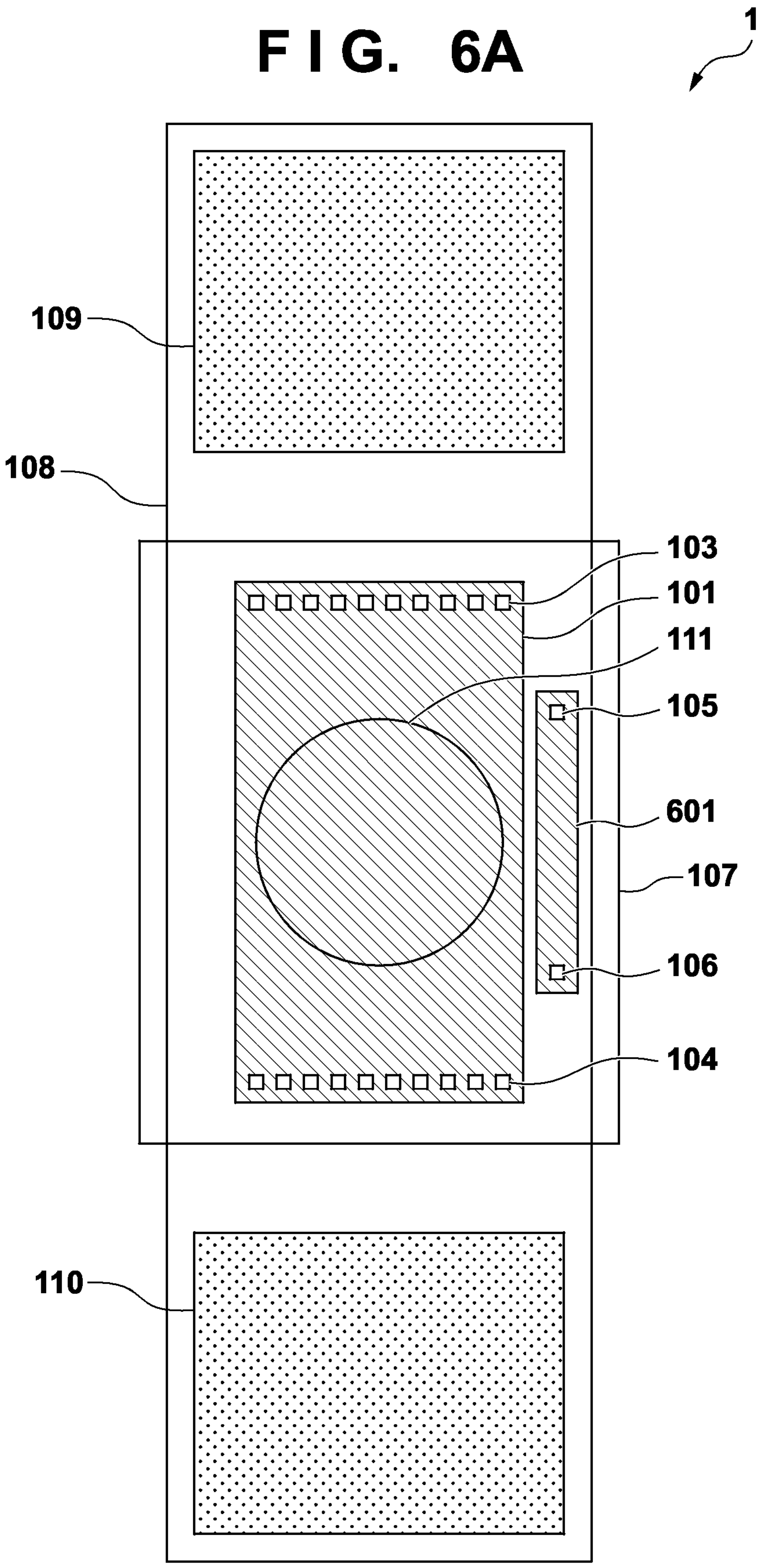
FIG. 6A is a schematic plan view of still another print element substrate according to the embodiment.
Figure 6B:
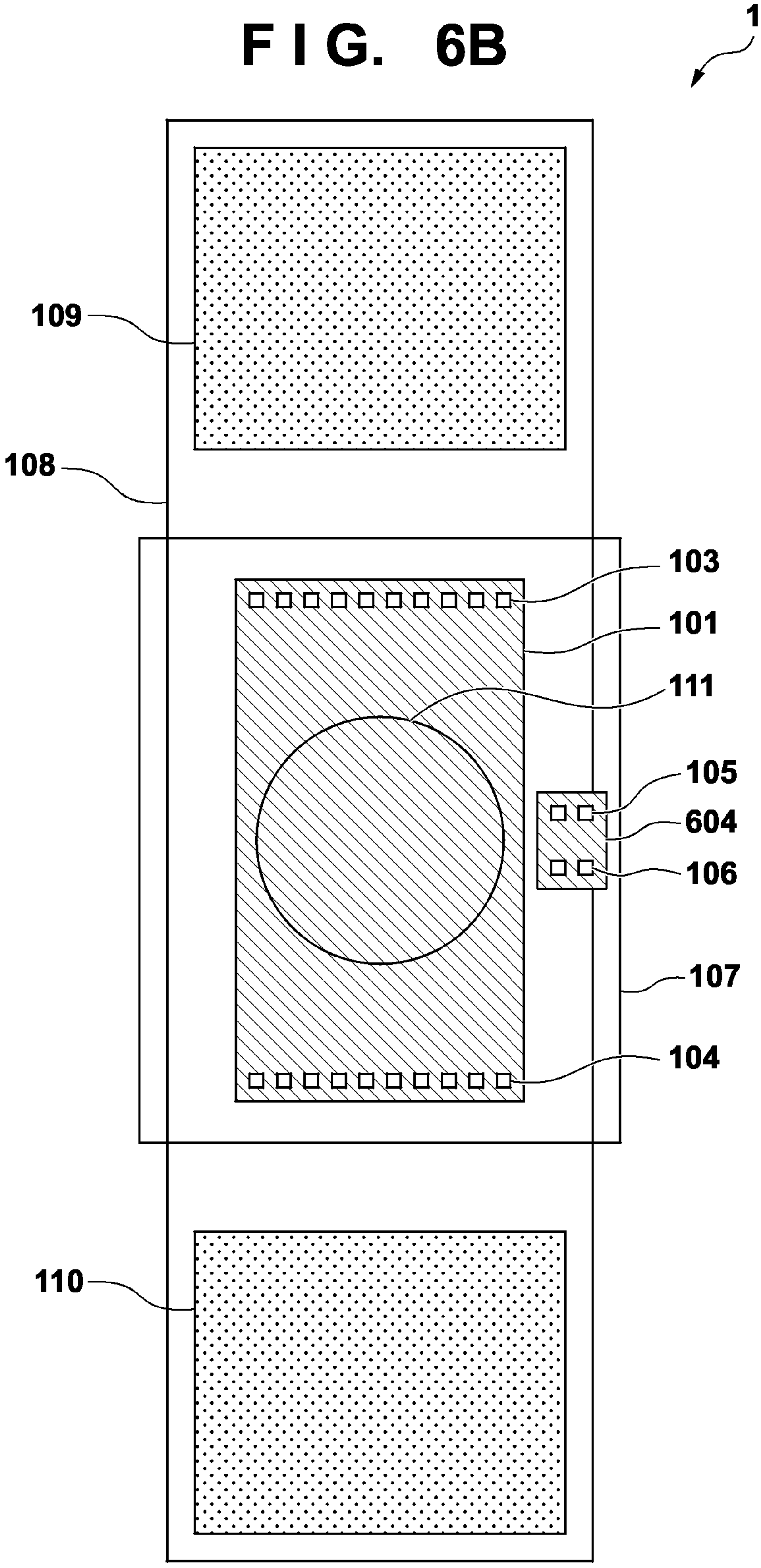
FIG. 6B is a schematic plan view of still another print element substrate according to the embodiment.

Each of FIGS. 6A and 6B is a schematic plan view of the print element substrate 1 serving as another example shown as in FIG. 1A. For the sake of discrimination, a temperature sensor 601 is used in the example shown in FIG. 6A, and a temperature sensor 604 is used in the example shown in FIG. 6B.

In the example shown in FIG. 6A, it is assumed that the electric resistance value of the heater 101 is smaller than in the case shown in FIG. 1A. In this case, the length of the temperature sensor 601 is set such that the voltage generated in the temperature sensor 601 when the current Iref is supplied to the temperature sensor 601 is equal to that in the case of the temperature sensor 102 (such that the voltage VS is obtained). That is, the length of the temperature sensor 601 may be set such that the electric resistance value of the temperature sensor 601 is equal to the electric resistance value of the temperature sensor 102. Accordingly, in the example shown in FIG. 6A, the temperature sensor 601 is longer than the temperature sensor 102.

In the example shown in FIG. 6B, it is assumed that the electric resistance value of the heater 101 is larger than in the case shown in FIG. 1A. Also in this case, as in FIG. 6A, the length of the temperature sensor 604 may be set such that the voltage generated in the temperature sensor 604 when the current Iref is supplied to the temperature sensor 604 is equal to that in the case of the temperature sensor 102 (such that the voltage VS is obtained). Accordingly, in the example shown in FIG. 6B, the temperature sensor 604 is shorter than the temperature sensor 102.

Note that in the example shown in FIG. 6B, if it is necessary to further decrease the electric resistance value of the temperature sensor 604 shorter than the temperature sensor 102, the width of the temperature sensor 604 may be increased. At this time, the temperature sensor 604 may be arranged so as to overlap the ink flow path 108 (bubbling chamber thereof) in a planar view. Further, when increasing the width of the temperature sensor 604, the number of the conductive plugs 105 and 106 may be increased as shown in FIG. 6B.

Second Embodiment

In the first embodiment described above, the structure has been exemplified in which the pair of temperature sensors 102 and 112 are respectively arranged on both sides of the heater 101 in the short-side direction so as to be adjacent to the heater 101. However, the present invention is not limited to this mode.

Figure 7:
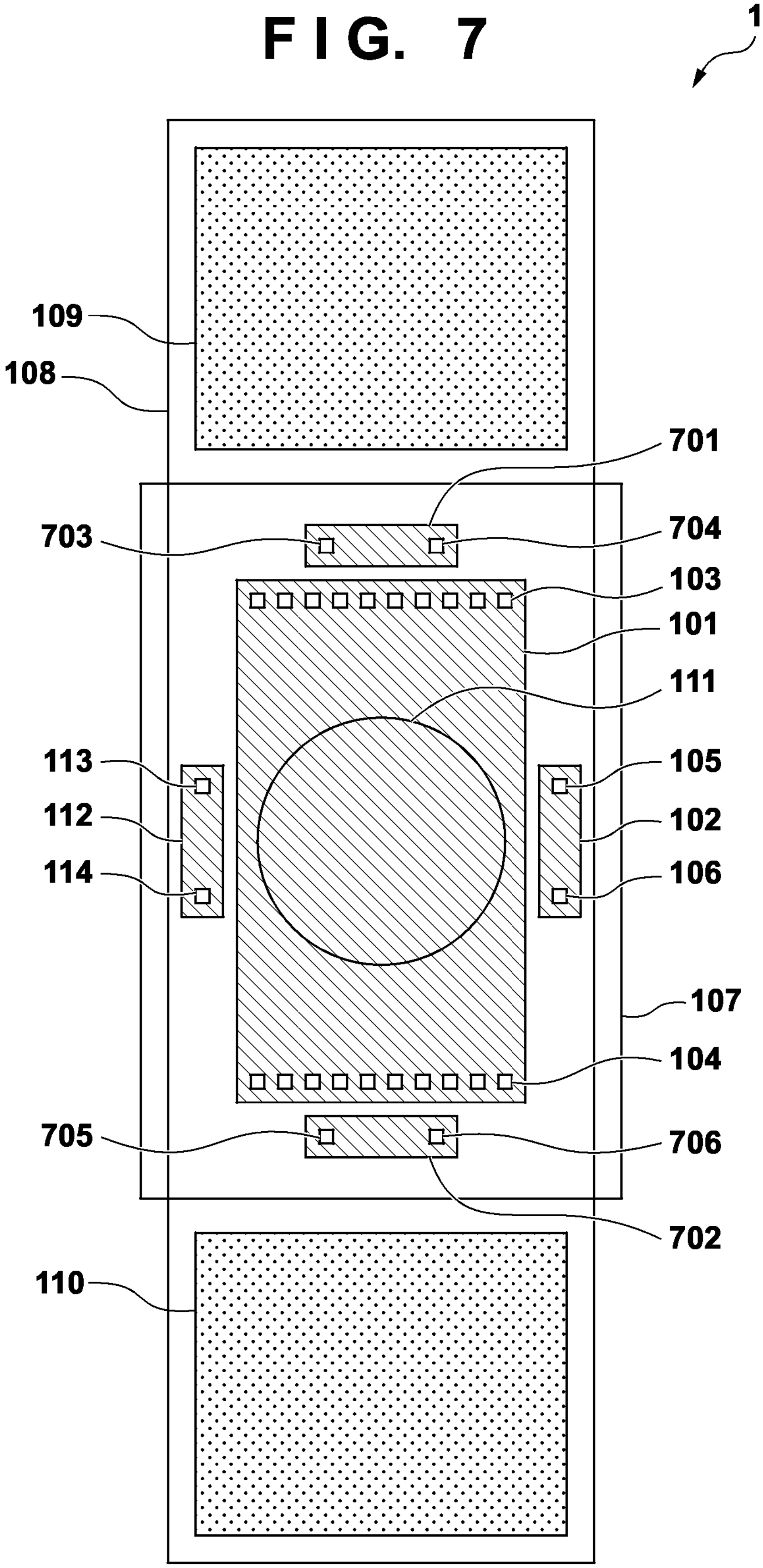
FIG. 7 is a schematic plan view of a print element substrate according to another embodiment.

FIG. 7 is a schematic plan view showing a part of the arrangement of a print element substrate 1 according to the second embodiment. In this embodiment, in addition to arranging temperature sensors 102 and 112, temperature sensors 701 and 702 are respectively arranged on both sides of a heater 101 in a long-side direction so as to be adjacent to the heater 101. That is, the temperature sensors 102, 112, 701, and 702 are respectively arranged along the four sides of the heater 101 so as to surround the heater 101 in a planar view.

Note that the temperature sensor 701 is connected to a predetermined wiring pattern via conductive plugs 703 and 704 provided in both end portions, and the temperature sensor 702 is connected to a predetermined wiring pattern via conductive plugs 705 and 706 provided in both end portions.

According to the arrangement (see FIG. 1B) in the first embodiment, if the return ink droplet 502 has been biased to the long-side side of the heater 101 in a planar view, this can be detected. According to this embodiment, it is further possible to detect that a return ink droplet 502 has been biased to the short-side side.

Further, according to this embodiment, it is also possible to calculate the discharge direction of the ink droplet 501 based on the drop modes of the detected temperatures of the temperature sensors 701 and 702 in addition to the temperature sensors 102 and 112, so that the calculation can be performed with higher accuracy than in the first embodiment.

Third Embodiment

Figure 8:
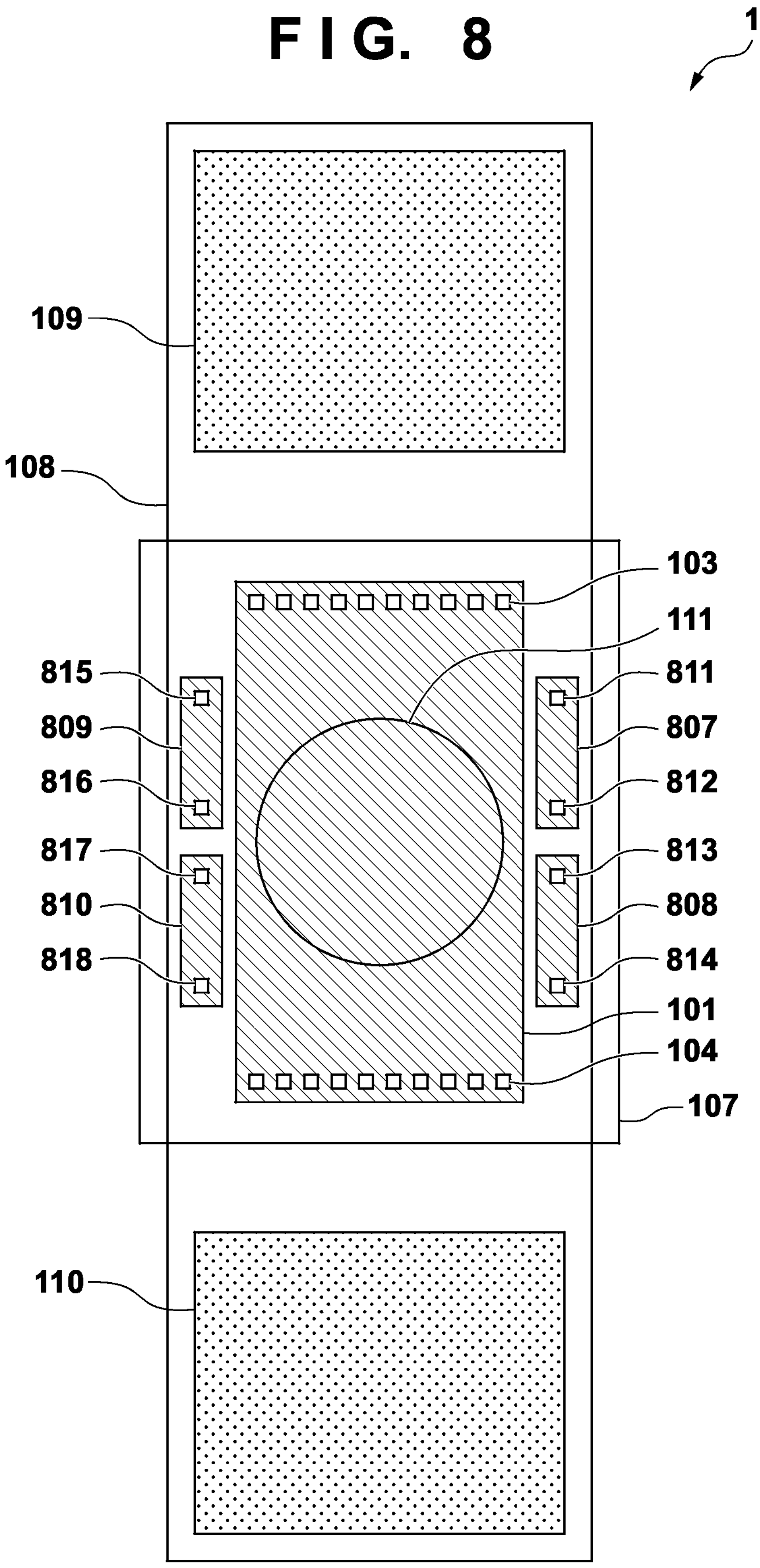
FIG. 8 is a schematic plan view of a print element substrate according to still another embodiment.

FIG. 8 is a schematic plan view showing a part of the arrangement of a print element substrate 1 according to the third embodiment. In this embodiment, a total of four temperature sensors 807 to 810 are arranged such that two temperature sensors are arranged on each long side of the heater 101. The temperature sensor 807 is connected to a predetermined wiring pattern via conductive plugs 811 and 812 provided in both end portions. The temperature sensor 808 is connected to a predetermined wiring pattern via conductive plugs 813 and 814 provided in both end portions. The temperature sensor 809 is connected to a predetermined wiring pattern via conductive plugs 815 and 816 provided in both end portions. The temperature sensor 810 is connected to predetermined wiring patterns via conductive plugs 817 and 818 provided in both end portions.

Even with the arrangement as described above, the effect similar to that in the second embodiment described above can be obtained. That is, if a feature point K (see FIG. 4) appears in the detection result of at least one of the temperature sensors 807 to 810, it can be determined that a return ink droplet 502 has occurred. Further, it is also possible to calculate the discharge direction of the ink droplet 501 based on the drop modes of the detected temperatures of the temperature sensors 807 to 810.

Fourth Embodiment

Figure 9:
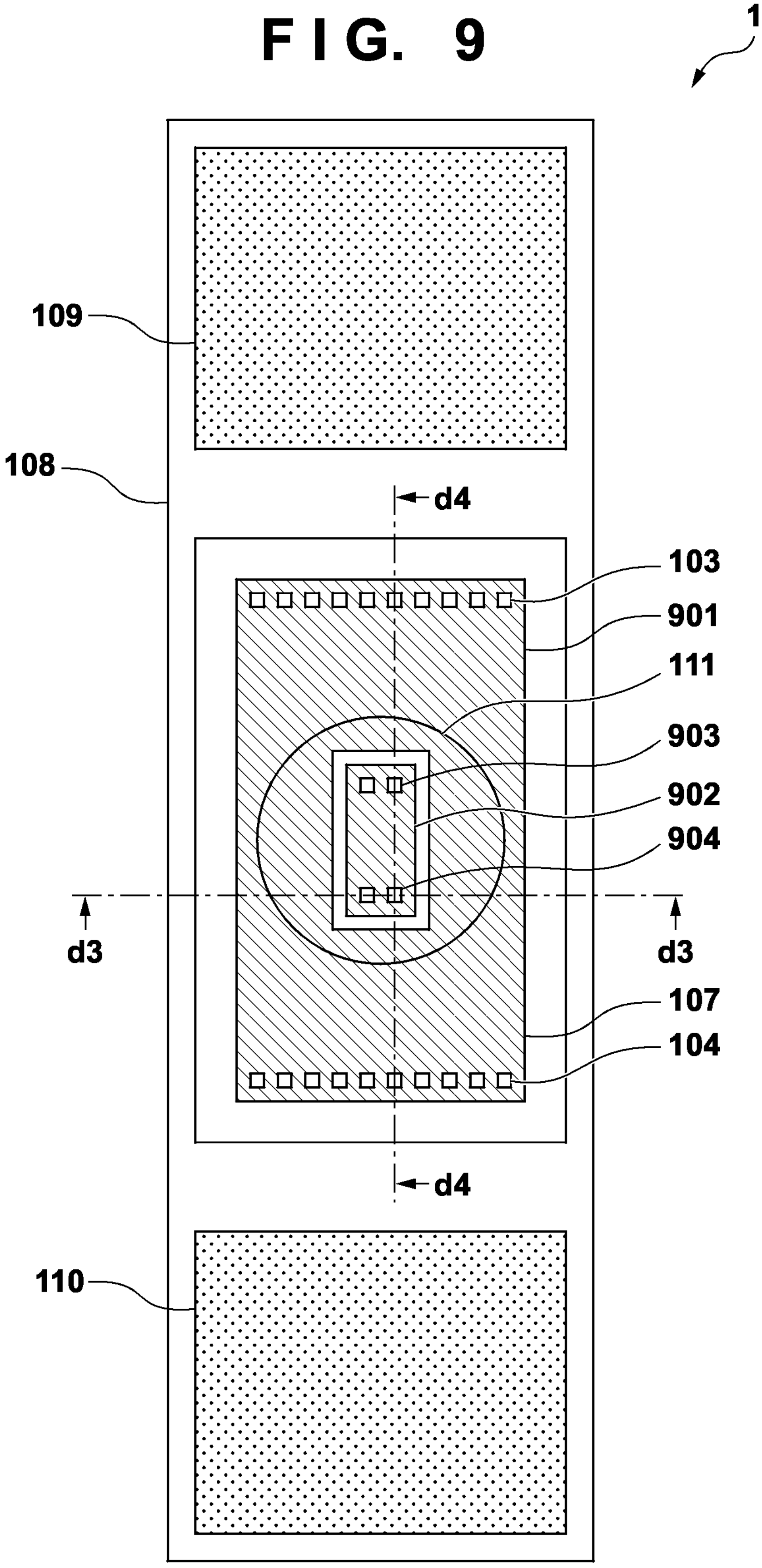
FIG. 9 is a schematic plan view of a print element substrate according to still another embodiment.
Figure 10A:
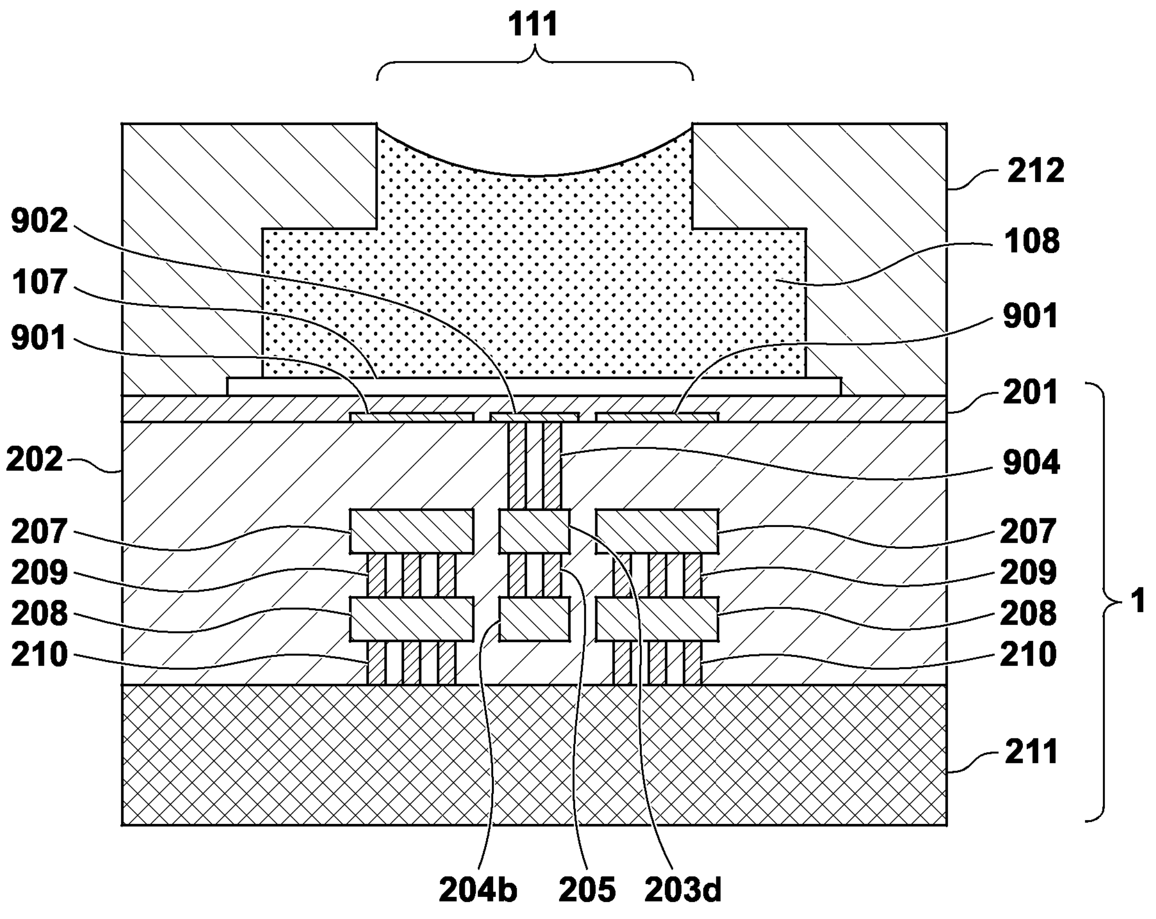
FIG. 10A is a schematic sectional view of the print element substrate according to the embodiment shown in FIG. 9.

FIG. 9 is a schematic plan view showing a part of the arrangement of a print element substrate 1 according to the fourth embodiment. FIG. 10A is a schematic sectional view taken along a cutting line d3-d3 in FIG. 9, and FIG. 10B is a schematic sectional view taken along a cutting line d4-d4 in FIG. 9.

In this embodiment, an opening is provided in the central portion of a heater (to be referred to as a heater 901 for discrimination) in a planar view, and a temperature sensor (to be referred to as a temperature sensor 902 for discrimination) is arranged in the opening. Similar to the heater 101, the heater 901 is connected to predetermined wiring patterns via conductive plugs 103 and 104 provided in both end portions. The temperature sensor 902 is connected to predetermined wiring patterns via conductive plugs 903 and 904 provided in both end portions.

Figure 10B:
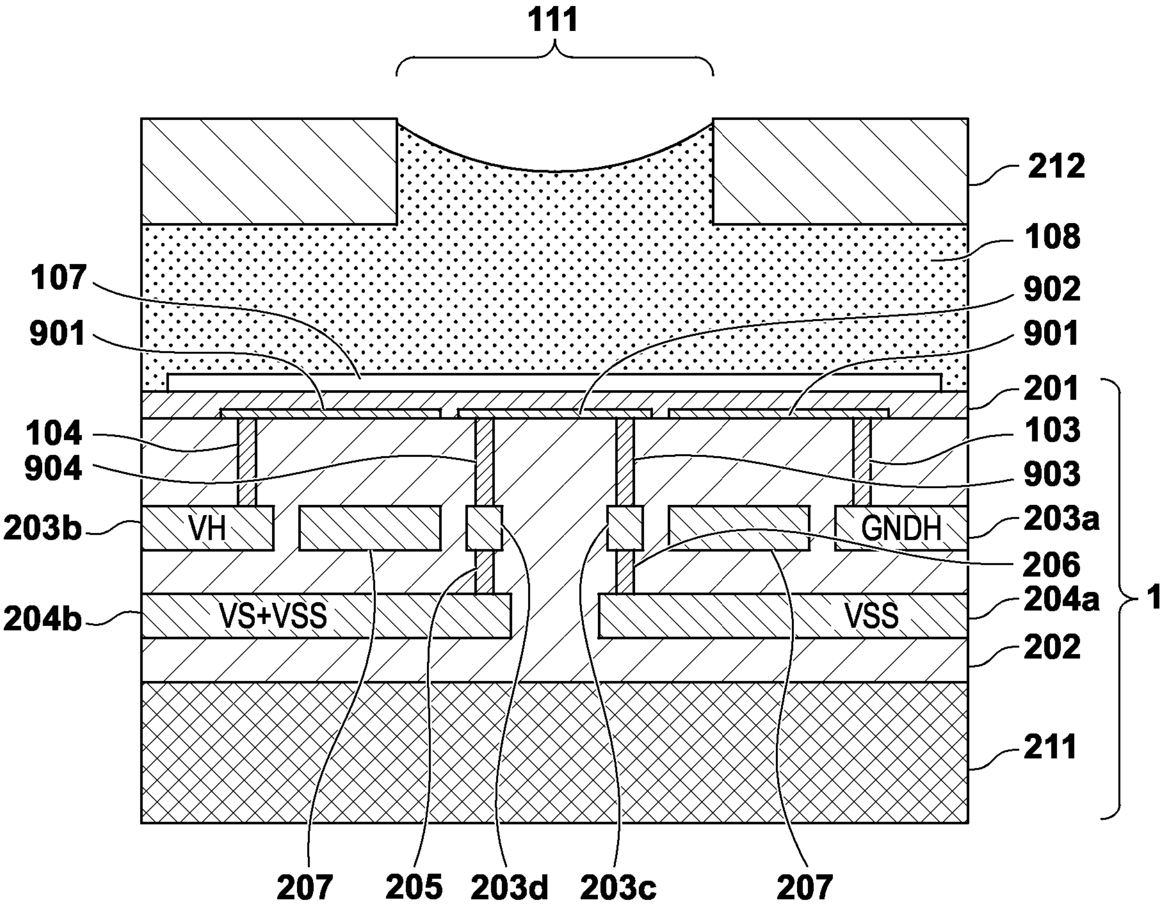
FIG. 10B is another schematic sectional view of the print element substrate according to the embodiment shown in FIG. 9.

So as to correspond to the opening provided such that the temperature sensor 902 can be arranged in the central portion of the heater 901, an opening may be provided in a heat dissipation pattern 207 such that the pattern 207 is electrically separated from wiring patterns 203*c* and 203*d* (see FIGS. 10A and 10B). That is, the heat dissipation pattern 207 is arranged so as to surround the wiring patterns 203*c* and 203*d*.

Similar to the heat dissipation pattern 207, an opening is provided in a heat dissipation pattern 208 such that the pattern 208 is electrically separated from wiring patterns 204*a* and 204*b*. That is, the pattern 208 is arranged so as to sandwich the wiring patterns 204*a* and 204*b*.

According to this embodiment, by providing an opening in the center portion of the heater 901 and providing the temperature sensor 902 in the opening, the temperature sensor 902 is surrounded by the heater 901 in its whole periphery. Therefore, the heat propagation efficiency from the heater 901 to the temperature sensor 902 is improved, and the detection accuracy of the temperature sensor 902 can be further improved.

Fifth Embodiment

Figure 11:
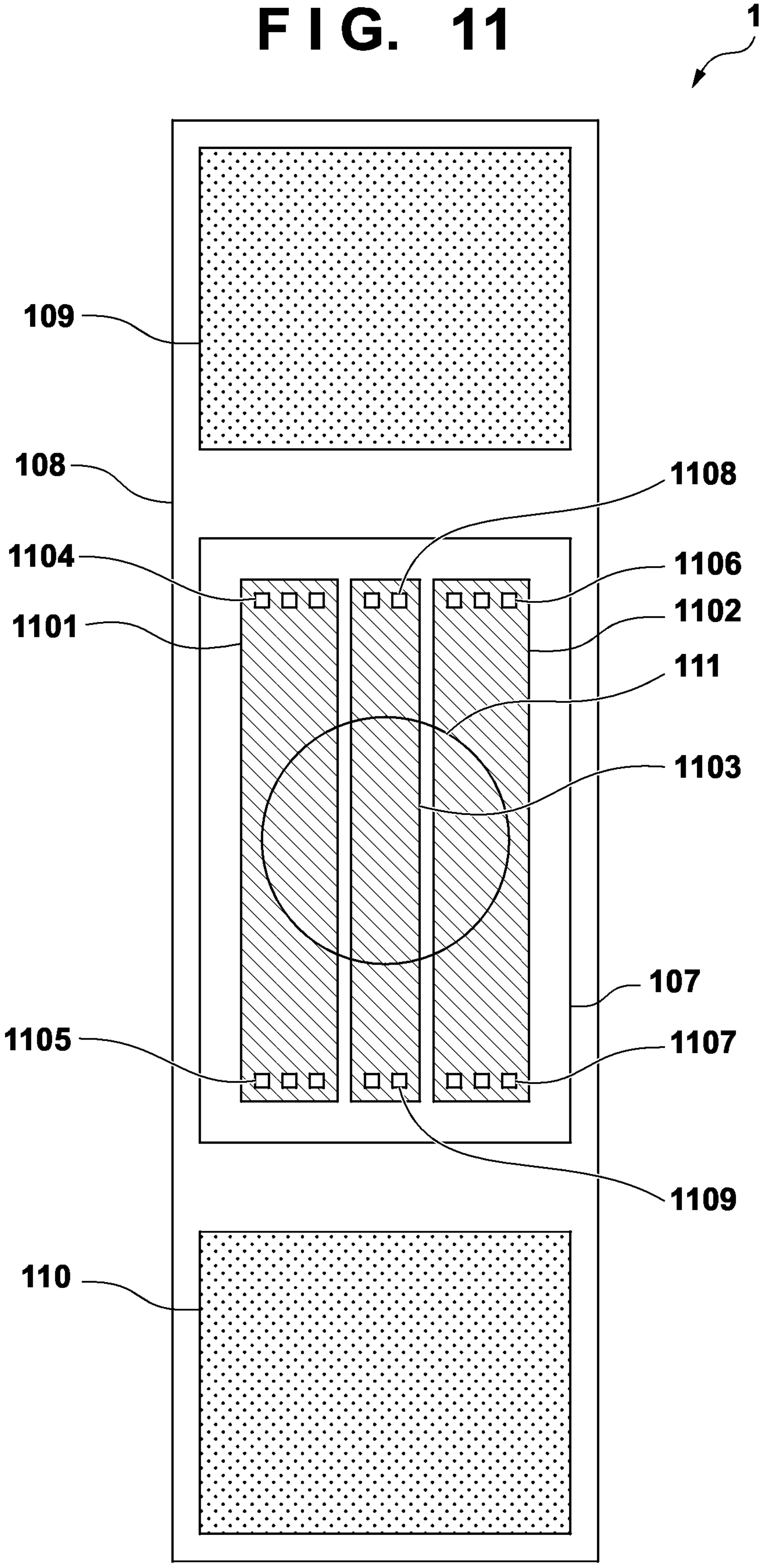
FIG. 11 is a schematic plan view of a print element substrate according to still another embodiment.

FIG. 11 is a schematic plan view showing a part of the arrangement of a print element substrate 1 according to the fifth embodiment. In this embodiment, the print element substrate 1 includes a pair of heaters (to be referred to as heaters 1101 and 1102 for discrimination) and a temperature sensor (to be referred to as a temperature sensor 1103 for discrimination). The heaters 1101 and 1102 are electrically connected in parallel, and they may be driven almost simultaneously when an ink droplet 501 is discharged. The heaters 1101 and 1102 and the temperature sensor 1103 are extended along the extending direction of an ink flow path 108 (the direction in which ink flows), and the temperature sensor 1103 is arranged between the heaters 1101 and 1102.

The heater 1101 is connected to predetermined wiring patterns via conductive plugs 1104 and 1105 provided in both end portions. The heater 1102 is connected to predetermined wiring patterns via conductive plugs 1106 and 1107 provided in both end portions. The temperature sensor 1103 is connected to predetermined wiring patterns via conductive plugs 1108 and 1109 provided in both end portions.

In this embodiment, the heaters 1101 and 1102 and the temperature sensor 1103 are extended along one direction. Therefore, as in the first embodiment described above (see FIGS. 1B, 2A, and 2B), heat dissipation patterns 207 and 208 can be arranged so as to be appropriately electrically separated from wiring patterns 203*a* to 203*d*, 204*a*, and 204*b*.

According to this embodiment, the heaters 1101 and 1102 are respectively arranged on both sides of the temperature sensor 1103. Therefore, the heat propagation efficiency from the heaters 1101 and 1102 to the temperature sensor 1103 is improved, and the detection accuracy of the temperature sensor 1103 can be further improved.

Sixth Embodiment

Figure 12:
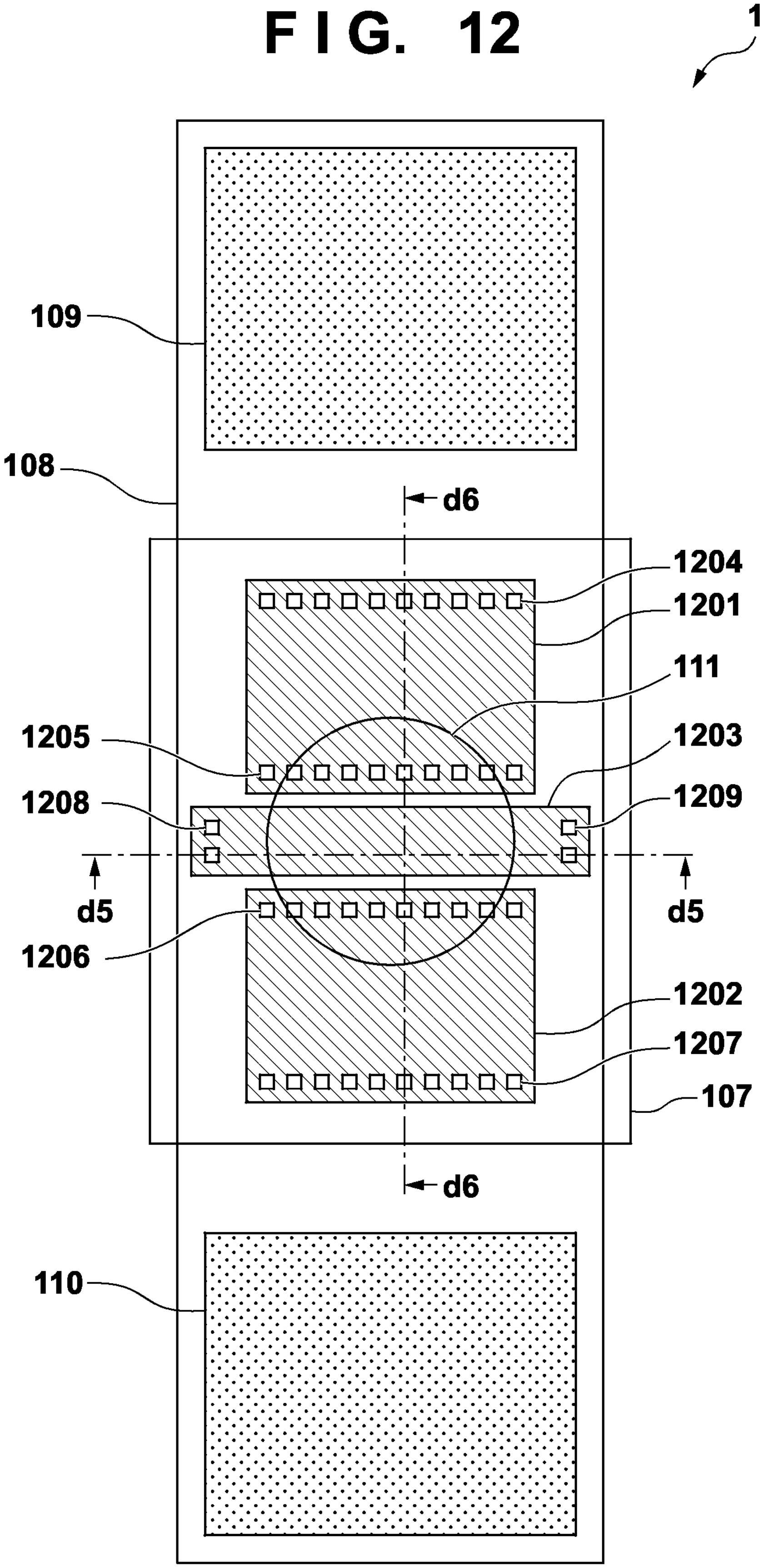
FIG. 12 is a schematic plan view of a print element substrate according to still another embodiment.
Figure 13A:
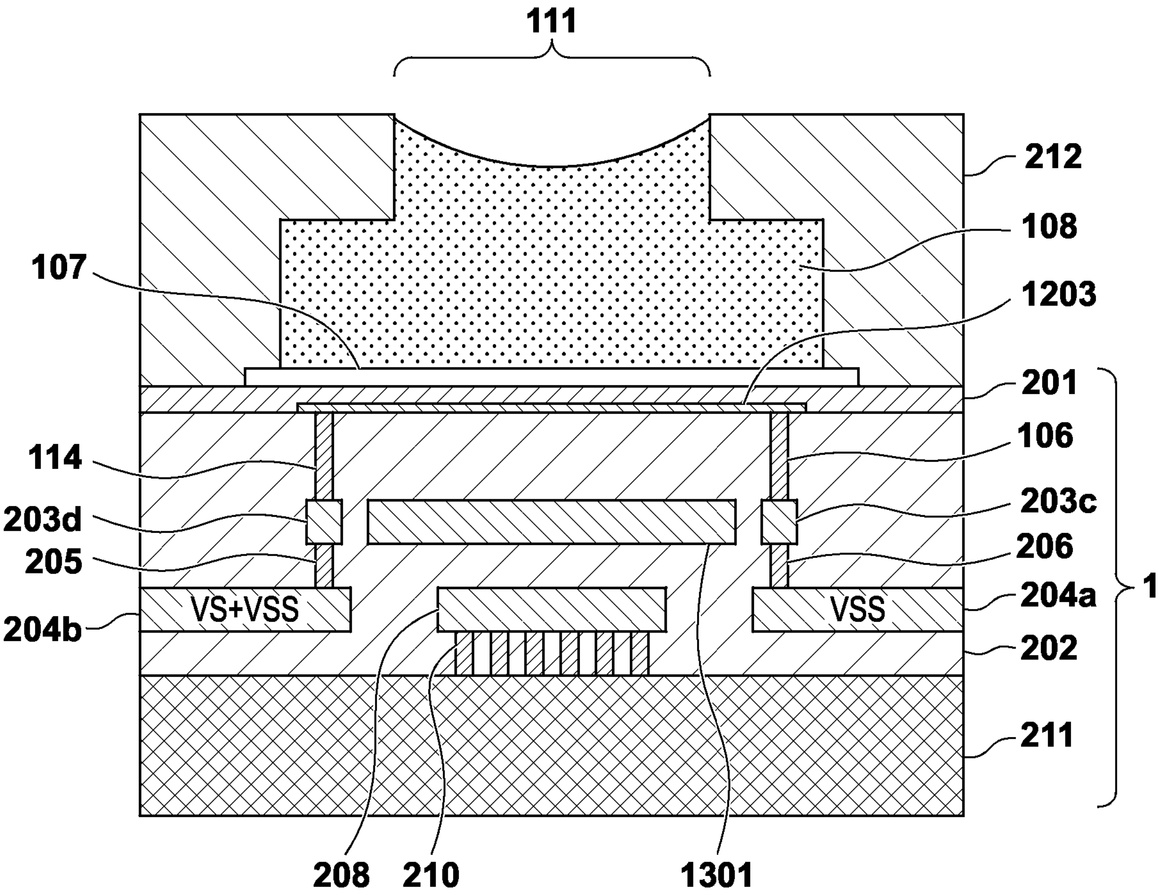
FIG. 13A is a schematic sectional view of the print element substrate according to the embodiment shown in FIG. 12.
Figure 13B:
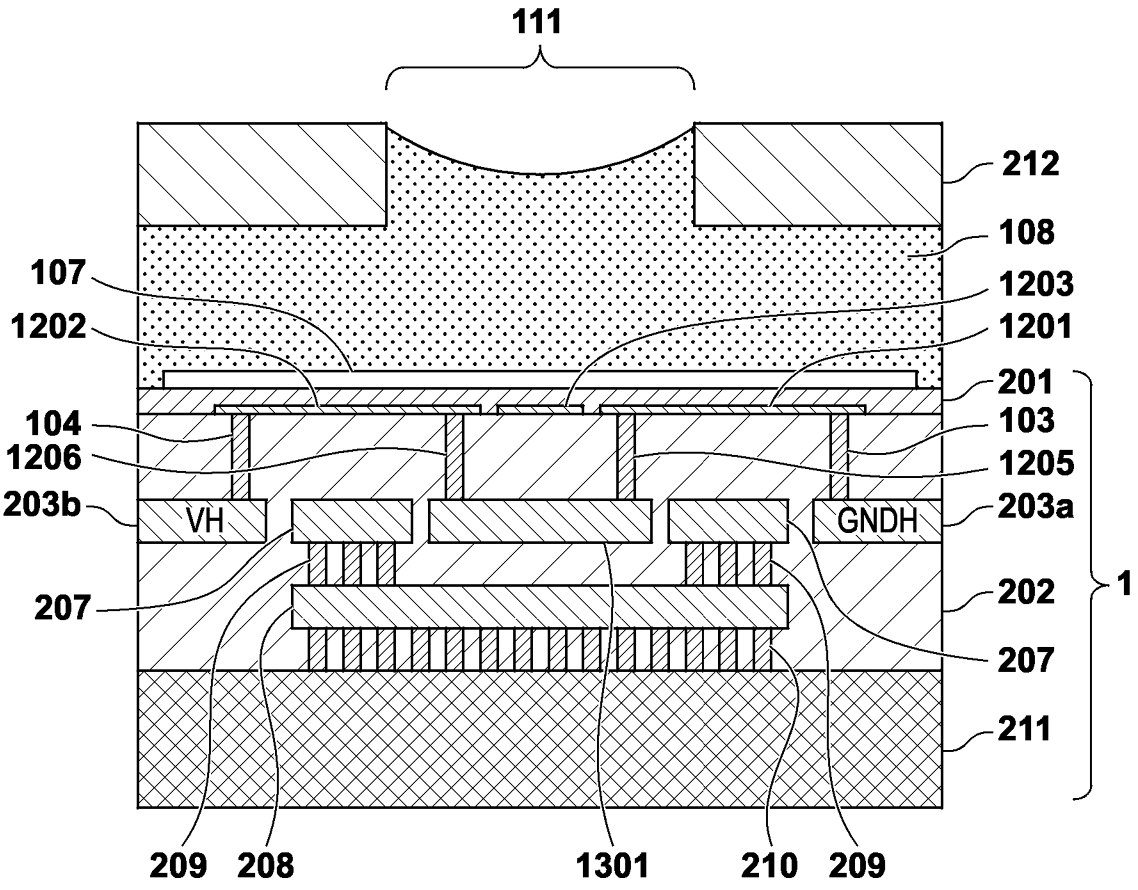
FIG. 13B is another schematic sectional view of the print element substrate according to the embodiment shown in FIG. 12.

FIG. 12 is a schematic plan view showing a part of the arrangement of a print element substrate 1 according to the sixth embodiment. FIG. 13A is a schematic sectional view taken along a cutting line d5-d5 in FIG. 12, and FIG. 13B is a schematic sectional view taken along a cutting line d6-d6 in FIG. 12.

In this embodiment, the print element substrate 1 includes a pair of heaters (to be referred to as heaters 1201 and 1202 for discrimination) and a temperature sensor (to be referred to as a temperature sensor 1203 for discrimination). The heaters 1201 and 1202 are juxtaposed and electrically connected in series in the extending direction of an ink flow path 108 (the direction in which ink flows), and they are driven almost simultaneously when an ink droplet 501 is discharged. The temperature sensor 1203 is arranged between the heaters 1201 and 1202, and extended in the widthwise direction of the ink flow path 108.

The heater 1201 is connected to predetermined wiring patterns via conductive plugs 1204 and 1205 provided in both end portions in the extending direction of the ink flow path 108. The heater 1202 is connected to predetermined wiring patterns via conductive plugs 1206 and 1207 provided in both end portions in the extending direction of the ink flow path 108. The heaters 1201 and 1202 are electrically connected in series via a wiring pattern 1301 in a second layer. The wiring pattern 1301 is connected to the heater 1201 via the conductive plug 1205 in one end portion, and connected to the heater 1202 via the conductive plug 1206 in the other end portion. The temperature sensor 1203 is connected to predetermined wiring patterns via conductive plugs 1208 and 1209 provided in both end portions in the widthwise direction of the ink flow path 108.

Since the wiring pattern 1301 is arranged below the temperature sensor 1203, a pair of heat dissipation patterns 207 respectively corresponding to the heaters 1201 and 1202 are arranged so as to be electrically separated from the wiring pattern 1301. That is, as shown in FIG. 13B, the wiring pattern 1301 is arranged between the pair of heat dissipation patterns 207. The pair of heat dissipation patterns 207 are respectively located below the pair of heaters 1201 and 1202.

According to this embodiment, the heat is propagated from both of the pair of heaters 1201 and 1202 to the temperature sensor 1203. Therefore, the heat propagation efficiency from the heaters 1201 and 1202 to the temperature sensor 1203 is improved and, as in the fifth embodiment described above, the detection accuracy of the temperature sensor 1203 can be further improved.

Others

In the above description, the printing apparatus using an inkjet printing method has been taken as an example and described, but the printing method is not limited to the above-described mode. Further, the printing apparatus may be a single-function printer having only a printing function, or a multifunction printer having a plurality of functions such as a printing function, a fax function, and a scanner function. Furthermore, the printing apparatus may be, for example, a manufacturing apparatus for manufacturing a color filter, an electronic device, an optical device, a micro-structure, or the like by a predetermined printing method.

The term "printing" described above should be interpreted in a broad sense. Accordingly, the mode of "printing" does not matter whether the object formed on a print medium is significant information such as characters and graphics, and also does not matter whether the object is visualized so that a human can visually perceive it.

Further, "printing medium" described above should be interpreted in a broad sense, similar to "printing" described above. Accordingly, the concept of "print medium" can include, in addition to paper which is generally used, any member that can accept ink, such as cloth, a plastic film, a metal plate, glass, ceramics, a resin, wood, leather, and the like.

Furthermore, "ink" should be interpreted in a broad sense, similar to "printing" described above. Accordingly, the concept of "ink" can include, in addition to a liquid that forms an image, a figure, a pattern, or the like by being applied onto a print medium, additional liquids that can be used for processing a print medium, processing ink (for example, coagulation or insolubilization of colorants in ink applied onto a print medium), or the like.

The present invention is not limited to the above embodiments and various changes and modifications can be made within the spirit and scope of the present invention. Therefore, to apprise the public of the scope of the present invention, the following claims are made.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-094906, filed on May 29, 2020, which is hereby incorporated by reference herein in its entirety.

What is claimed is:

1. A print element substrate,. comprising:

a base;

a plurality of heaters, each of which is provided in a layer on the base and configured to generate heat for discharging ink;

a flow path member that, forms an ink flow path and is configured to form, together with the base, a bubbling chamber having a heater in a bottom surface thereof in which the ink can be bubbled by heat of the heater provided therein; and a plurality of temperature sensors, each of which is capable of detecting a temperature of the bubbling chamber, each of the temperature sensors being formed of the same material as the plurality of heaters and being provided on the base in the same layer as the plurality of heaters, wherein a heat dissipation pattern overlaps the heaters in a planar view, the heat dissipation pattern being formed in a lower layer with respect to the heaters and being connected to the base via a conductive plug, at least one temperature sensor is provided for each heater, and each temperature sensor overlaps the bubbling chamber in a planar view.

2. The substrate according to claim 1, further comprising an anti-cavitation film provided in an upper layer of the heaters, wherein the anti-cavitation film is arranged so as to overlap both the heaters and the temperature sensors in a planar view.

3. The substrate according to claim 1, wherein each of the heaters and the temperature sensors are connected to a wiring pattern provided in a lower layer thereof via a conductive plug.

4. The substrate according to claim 1, wherein the heaters are driven by energization, and the temperature sensors are extended along an energization direction of the heaters and close to the heaters in a planar view.

5. The substrate according to claim 1, wherein the temperature sensor comprises a pair of the temperature sensors, and the heaters are arranged between the pair of the temperature sensors.

6. The substrate according to claim 1, wherein in a planar view an opening is provided in each of the heaters, and the temperature sensors are arranged in the openings.

7. The substrate according to claim 1, wherein each of the heaters comprises a pair of heaters, and the temperature sensors are arranged between the pair of heaters.

8. The substrate according to claim 7, wherein pairs of heaters are electrically connected in parallel.

9. The substrate according to claim 7, wherein pairs of heaters are electrically connected in series.

10. A printhead, comprising:

the print element substrate according to claim 1; and a plurality of nozzles corresponding to the plurality of heaters, each of the nozzles being configured to discharge a liquid, wherein at least one temperature sensor is provided for each nozzle.

11. A printing apparatus, comprising:

the printhead according to claim 10, wherein the printing apparatus is configured to print by discharging ink from the printhead to a print medium.

* * * * *